US011968316B1

(12) United States Patent
Pala

(10) Patent No.: US 11,968,316 B1
(45) Date of Patent: *Apr. 23, 2024

(54) SYSTEMS AND METHODS FOR ENHANCED PUBLIC KEY INFRASTRUCTURE

(71) Applicant: CABLE TELEVISION LABORATORIES, INC, Louisville, CO (US)

(72) Inventor: Massimiliano Pala, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,979

(22) Filed: Jan. 9, 2023

Related U.S. Application Data

(63) Continuation of application No. 16/537,380, filed on Aug. 9, 2019, now Pat. No. 11,552,806.

(60) Provisional application No. 62/869,953, filed on Jul. 2, 2019, provisional application No. 62/713,165, filed on Aug. 1, 2018.

(51) Int. Cl.
*H04L 9/32* (2006.01)
*H04L 9/14* (2006.01)

(52) U.S. Cl.
CPC .............. *H04L 9/3268* (2013.01); *H04L 9/14* (2013.01); *H04L 9/3247* (2013.01)

(58) Field of Classification Search
None
See application file for complete search history.

(56) References Cited

U.S. PATENT DOCUMENTS

| 6,931,537 | B1* | 8/2005 | Takura | H04L 9/3297 |
| | | | | 713/180 |
| 2014/0014715 | A1 | 1/2014 | Moran et al. | |
| 2018/0097640 | A1* | 4/2018 | Queralt | G06F 21/41 |
| 2018/0262504 | A1* | 9/2018 | Frederick | H04L 9/006 |
| 2019/0020641 | A1* | 1/2019 | Wasily | H04L 9/3213 |
| 2019/0036688 | A1 | 1/2019 | Wasily et al. | |

OTHER PUBLICATIONS

Fatima et al., X.509 and PGP Public Key Infrastructure Methods: A Critical Review, 2015, IFCSNS International Journal of Computer Science nd Network Security vol. 15, No. 5: pp. 55-59 (Year: 2015).*

(Continued)

*Primary Examiner* — Luu T Pham
*Assistant Examiner* — Edward X Long
(74) *Attorney, Agent, or Firm* — Josh C. Snider; Snider IP

(57) ABSTRACT

A system for enhanced public key infrastructure is provided. The system includes a computer device. The computer device is programmed to receive a digital certificate including a composite signature field including a plurality of signatures. The plurality of signatures include at least a first signature and a second signature. The computer device is also programmed to retrieve, from the digital certificate, a first key associated with the first signature from the digital certificate. The computer device is further programmed to retrieve the first signature from the composite signature field. In addition, the at least one computer device is programmed to validate the first signature using the first key.

17 Claims, 2 Drawing Sheets

(56) References Cited

OTHER PUBLICATIONS

Paquin, C., Stebila, D. and Tamvada, G., 2020. Benchmarking post-quantum cryptography in TLS. In Post-Quantum Cryptography: 11th International Conference, PQCrypto 2020, Paris, France, Apr. 15-17, 2020, Proceedings 11 (pp. 72-91). Springer International Publishing. (Year: 2020).*

Burstinghaus-Steinbach, K., Krauß, C., Niederhagen, R. and Schneider, M., Oct. 2020. Post-quantum tls on embedded systems: Integrating and evaluating kyber and sphincs+ with mbed tls. In Proceedings of the 15th ACM Asia Conference on Computer and Communications Security (pp. 841-852). (Year: 2020).*

Harn, L., and Rn, J., 2011. Generalized digital certificate for user authentication and key establishment for secure communications. IEEE Transactions on Wireless Communications, 10(7), pp. 2372-2379. (Year: 2011).

Sun, Y., Zhang, R., Wang, X., Gao, K. and Liu L., Jul. 2018. A decentralizing attribute-based signature for healthcare blockchain. In 2018 27th International conference on computer communication and networks (ICCCN) (pp. 1-9). IEEE. (Year: 2018).

* cited by examiner

SYSTEMS AND METHODS FOR ENHANCED PUBLIC KEY INFRASTRUCTURE

CROSS REFERENCE TO RELATED APPLICATIONS

This application is a continuation of U.S. patent application Ser. No. 16/537,380, filed Aug. 9, 2019, which application claims the benefit of and priority to U.S. Provisional Patent Application No. 62/869,953, filed Jul. 2, 2019, entitled "COMPOSITE KEYS AND SIGNATURES FOR DATA AUTHENTICATION," which claims priority to U.S. Provisional Patent Application No. 62/713,165, filed Aug. 1, 2018, entitled "COMPOSITE KEYS AND SIGNATURES FOR DATA AUTHENTICATION," the entire contents and disclosure of which is incorporated by reference in its entirety.

BACKGROUND

The field of the disclosure relates generally to an enhanced public key infrastructure (PKI), and more particularly, to systems and methods for providing public key infrastructure with support for multiple keys with multiple encryption methods.

Many conventional electronic devices utilize digital certificates, such as X.509 certificates to establish trust between devices. The digital certificates are tied to the identity of a person or legal entity, typically through a trusted Certificate Authority (CA). Overtime the digital certificates may need to be revoked for a variety of reasons, including the encryption keys associated with the certificate have been compromised.

One of the major security features of the digital certificates is the security of the public and private key associated with the certificate. Since the security of PKIs depends on the security of the cryptographic building blocks that are used for authentication and encryption, the standard communication has made algorithm agility one of the main goals to provide the possibility to use different algorithm and potentially upgrade to newly available algorithms when needed.

However, present key systems do not account for the definition of new algorithms (e.g. more efficient factoring techniques) and technologies (e.g., quantum-based computing devices) that may be available in the near future. Accordingly, there is a need for easy-to-deploy and efficient solutions to provide support for multi-algorithm authentication.

SUMMARY

In an embodiment, a system for enhanced public key infrastructure is provided. The system includes a computer device including at least one processor in communication with at least one memory device. The at least one memory device stores a plurality of instructions. The at least one processor is programmed to receive a digital certificate including a composite signature field including a plurality of signatures. The plurality of signatures include at least a first signature and a second signature. The at least one processor is also programmed to retrieve, from the digital certificate, a first key associated with the first signature from the digital certificate. The at least one processor is further programmed to retrieve the first signature from the composite signature field. In addition, the at least one processor is programmed to validate the first signature using the first key.

In another embodiment, a computing device for enhanced public key infrastructure is provided. The computing device includes at least one processor in communication with at least one memory device. The at least one memory device stores a plurality of instructions. The at least one processor is programmed to generate a first signature using a first key and a first cryptographic algorithm. The at least one processor is also programmed to generate a second signature using a second key and a second cryptographic algorithm. The at least one processor is further programmed to combine the first signature and the second signature into a composite signature. In addition, the at least one processor is programmed to generate a digital certificate including the composite signature in a single field.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
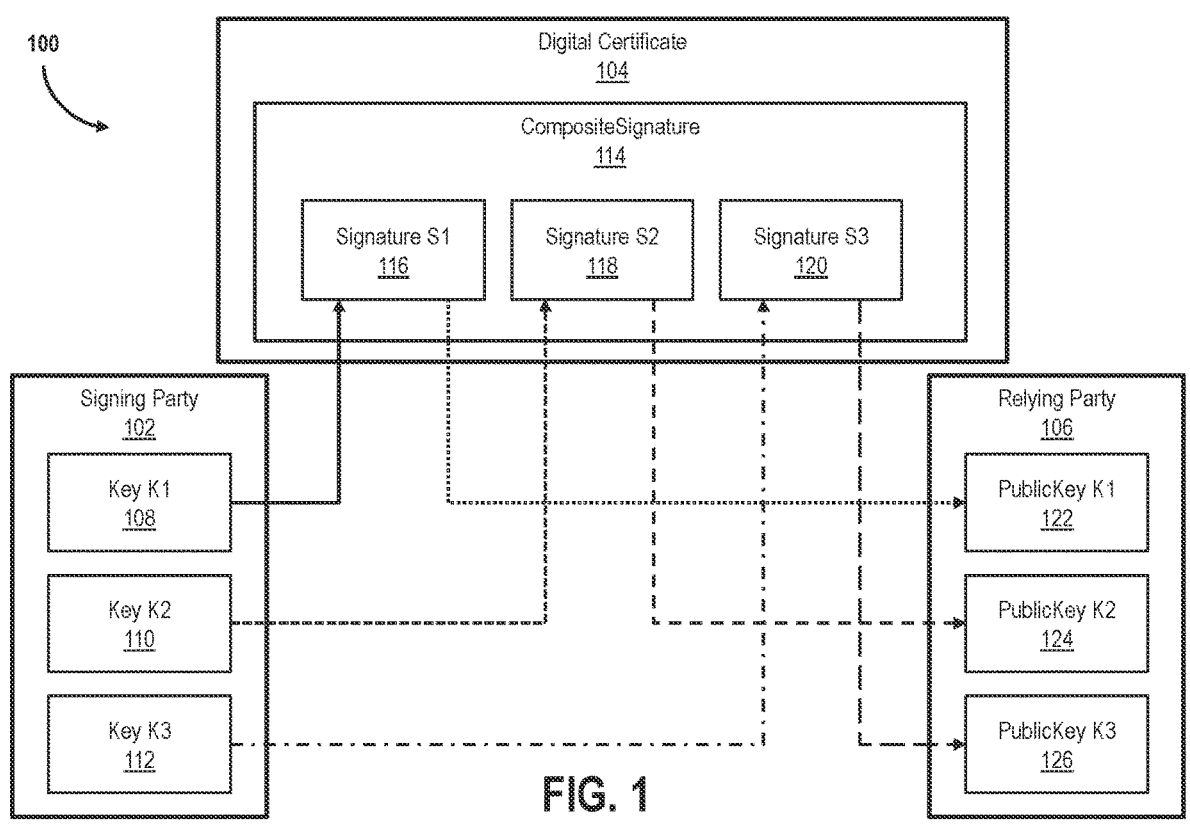
FIG. 1 is a schematic illustration of a composite signature process and the data structures used with the composite signature process, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein provide systems and methods for enhanced public key infrastructure (PKI) by providing support for multiple keys with multiple encryption methods. More specifically, the systems and methods described herein provide for composite keys and composite signatures that allow digital certificates to support more than one public key.

In an exemplary embodiment, the present systems and methods utilize an X.509 trust model, in which a trusted third party CA is responsible for signing digital certificates. Accordingly, as described herein, the CA is presumed to have capability to store one or more trusted root certificates (or intermediate certificates) as well as the corresponding private keys. The CA is further responsible for maintaining up-to-date revocation information regarding the validity of issued certificates, and will provide information to the other parties, for example, through an Online Certificate Status Protocol (OCSP). In some embodiments, the CA may provide information according to a Certificate Revocation List (CRL). The OCSP is an Internet protocol for obtaining a revocation status of an X.509 digital certificate, and is generally considered an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

In an X.509 Certificate the specification allows for a single public key as described here:
AlgorithmIdentifier::=SEQUENCE {
  algorithm OBJECT IDENTIFIER
  parameters ANY DEFINED BY algorithm OPTIONAL}
SubjectPublicKeyInfo::=SEQUENCE {
  algorithm AlgorithmIdentifier
  subjectPublicKey BIT STRING}

In particular, the ("SubjectPublicKeyInfo") comprises an ("algorithmIdentifier") that identifies the cryptographic algorithm and associated parameters, and a ("subjectPublicKey") which is a BIT STRING, such as shown in RFC (Request for Comment) 5280. The value of the "subjectPublicKey") is the DER (distinguished encoding rules) encoding of the public key structure as defined for the specific algorithm used. For example, section 2.3.1 of RFC 3279 defines the contents of the ("subjectPublicKeyInfo") and how to encode the ("RSAPublicKey") structure whose DER representation is to be used for the value of the ("subjectPublicKey") BIT STRING. In some embodiments, the digital certificate may include an extension that allows it to encode an additional public key and additional signatures.

In the exemplary embodiment, multiple public keys and signatures are encoded into the digital certificate using composite keys and composite signatures. This requires defining new algorithm identifiers and the associated encoding that utilizes standard sub-structures to simplify supporting sets of keys and their respective signatures. Accordingly, this may support the deployment of hybrid PKIs where the authentication may be performed by using 'traditional' or 'quantum resistant' cryptography. Furthermore, the systems and methods described herein could also be used to provide mixed authentication mechanisms that allow relying parties to rely on more than one algorithm for both signing and hashing to authenticate data (e.g., Certificates, CRLs, Generic Signed Data, etc.). For example, authentication could be performed by using the same cryptographic scheme with different hashing algorithms (e.g., one signature could be RSAwithSHA256 and another signature could be RSAwithSHA512). In another example, authentication could be performed with different cryptographic schemes with the same hashing algorithm (e.g., one signature could be with RSAwithSHA256 and another could be ECDSAwithSHA256). These examples could also be combined.

The relying party may decide to verify one, some, or all of the signatures in order to trust the authentication of the data. The relying party may decide based on the ability of the relying party to support the algorithms used for keys and signatures.

While the systems, methods, and examples described herein focus on X.509 keys and signatures, the systems and methods described herein may be used with other trust models to provide for encoding multiple keys and multiple signatures. In particular, the systems and methods described herein may be used with any public key solution that makes use of public key technology and provides a method to distinguish among algorithms for keys and signatures. The process described herein may be applied to non-X.509 infrastructures.

In the exemplary embodiment, a new value is added to the 'algorithm' field within the 'AlgorithmIdentifier' used in the 'SubjectPublicKeyInfo' of a digital certificate, such as an X.509 Certificate. The new value is a specific object identifier or (OID) to specify the user of a 'composite key' scheme where multiple public keys are used in a certificate. The 'parameters' field of the 'AlgorithmIdentifier' is set to NULL in this case. One example definition of an OID that may be sued with a multiple-key schema ('compositeKeys') is as follows:

compositeKeys OBJECT IDENTIFIER::={iso(1) identified-organization (3) dod (6) internet (1) private (4) enterprise (1) OpenCA (188227) 10}

When the 'compositeKeys' value is used for the 'AlgorithmIdentifier,' the value encoded in the associated public key field (e.g., 'subjectPublicKey') contains multiple public keys and their associated parameters. Specifically, the public key value is encoded as the DER representation of a 'CompositePublicKeyInfo.' The "CompositePublicKeyInfo' is defined as a sequence of 'subjectPublicKeyInfo' where each 'subjectPublicKeyInfo' carries the information about one public key that is encoded in the certificate. The definition of 'CompositePublicKeyInfo' is as follows:

CompositeSubjectPublicKeyInfo::=SEQUENCE (1..MAX) OF SubjectPublicKeyInfo (1..MAX)

where the 'SubjectPublicKeyInfo' inside the 'CompositeSubjectPublicKeyInfo' may not use the 'compositeKey' as the algorithm identifier.

For example, having two different public keys in an X.509 certificate would be encoded as follows:

aCompositeSubjectPublicKeyInfo={keyInfoOne, keyInfoTwo};
        This is the main structure with a sequence of two subjectPublicKeyInfo.
    keyInfoOne.algorithm.algorithm=rsaEncryption;
    keyInfoOne.algorithm.parameters=NULL;
    keyInfoOne.subjectPublickKey=RSAPublicKey;
        keyInfoOne provides the information/definition of the first key (RSA)
    keyInfoTwo.algorithm.algorithm=id-ecPublicKey;
    keyInfoTwo.algorithm.parameters=EcpkParameters;
    keyInfoTwo.subjectPublickKey=ECPoint;
        keyInfoTwo provides the information/definition of the second key (ECDSA)
    aCertificate.tbsCertificate.subjectPublicKeyInfo.algorithm.algorithm=compositeKey;
    aCertificate.tbsCertificate.subjectPublicKeyInfo.algorithm.parameters=NULL;
    aCertificate.tbsCertificate.subjectPublicKeyInfo.algorithm.subjectPublicKey=DER (aCompositeSubjectPublicKeyInfo);

where 'aCompositeSubjectPublicKeyInfo' is the sequence of two 'subjectPublicKeyInfo' (i.e., keyInfoOne and keyInfoTwo). The DER representation of the sequence is then stored in the subjectPublicKey field of subjectPublicKeyInfo in the certificate structure.

In the exemplary embodiment, a new value is added to the 'algorithm' field within the 'AlgorithmIdentifier' used in a digital certificate, such as an X.509 Certificate. The new value identifies a 'composite signature' schema where multiple signatures are used to authenticate the contents of a certificate. The 'parameters' field of the "AlgorithmIdentifier' is set to NULL in this case. One example definition of an OID that may be sued with a multiple-key schema ('compositeSignatures') is as follows:

compositeSignatures OBJECT IDENTIFIER::={iso(1) identified-organization (3) dod (6) internet (1) private (4) enterprise (1) OpenCA (188227) 11}

When the 'compositeSignatures' value is used for the algorithm identifier in the 'signatureAlgorithm' field of the certificate, the value encoded in the corresponding 'signatureValue' field contains multiple signatures and their associated parameters. Specifically, the 'signatureValue' field is the DER representation of a 'CompositeSignatureValue' that is a sequence of 'SignatureInfo' where each 'SignatureInfo' carries the information about one of the signatures applied to the certificate. The definition of 'CompositeSignatureInfo' is as follows:

CompositeSignatureValue::=SEQUENCE (1..MAX) OF CompositeSignatureInfo

For example, in order to encode signatures made with two different keys (aka one RSA key and one EC key) the certificate would be encoded as follows:

aCompositeSignatureInfo={sigInfoOne, sigInfoTwo};
        This is the main structure with a sequence of two SignatureInfo.
    sigInfoOne.algorithm.algorithm=rsaEncryption;
    sigInfoOne.algorithm.parameters=NULL;
    sigInfoOne.subjectPublickKey=<RSA Signature Value>;
        sigInfoOne provides the definition of the first signature (RSA)
    sigInfoTwo.algorithm.algorithm=id-ecPublicKey;
    sigInfoTwo.algorithm.parameters=EcpkParameters;
    sigInfoTwo.subjectPublickKey=<ECDSA Signature Value>;
        sigInfoTwo provides the definition of the second signature (ECDSA)
    aCertificate.signatureAlgorithm.algorithm.algorithm=compositeKey;
    aCertificate.signatureAlgorithm.algorithm.parameters=NULL;
    aCertificate.signatureValue=DER (aCompositeSignatureInfo);

where 'aCompositeSignatureInfo' is the sequence of two 'SignatureInfo' (i.e., sigInfoOne and sigInfoTwo). The aCompositeSignatureInfo is then encoded by using DER and the output value is used for the 'signatureValue' field of the certificate structure.

In the exemplary embodiment, to generate the composite signatures, the signer generates each signature independently by using the set of keys in order. If the public keys that are used to verify the signatures are encoded in a 'CompositeSubjectKeyInfo' structure, the signer uses the first key to generate the first signature, the second key is used to generate the second signature, the third key is used to generate the third signature, etc. The signer generates one signature for each key in the key set. For example, 'CompositeSubjectKeyInfo' contains three keys K1, K2, and K3, which are of types RSA, RSA, and EC respectively. The signing party generates the first signature using key K1, the second signature using key K2, and the third signature using key K3.

In the exemplary embodiment, to verify the composite signatures, the relying party verifies each of the applied signatures independently. In some embodiments, the relying party might decide to not evaluate all of the signatures. This may be the case where the relying party does not support the associated algorithm, or otherwise refuse to trust the signed data entirely if the relying party is not able to verify one or more elements in the composite signatures.

When the signer of a composite signature has an associated certificate, the relaying party may verify the signature by using the corresponding public key in the composite keys in order. In the exemplary embodiment, the order of the single signatures within the composite signature matches the order of the keys in the composite key certificate. For example, 'CompositeSubjectPublicKeyInfo' contains three keys K1, K2, and K3, which are of types RSA, RSA, and EC respectively. The relaying party verifies the first signature in the composite signature by using key K1, the second signature using key K2, and the last signature using key K3.

In some embodiments, the composite crypto structures may be used for trust structures to allow for backward compatibility or to allow for future upgrades to cryptographic capabilities. In these embodiments, the composite keys and composite signatures could include both weak and strong algorithms. Relying parties without updated cryptographic suites, such as devices that are already in the field, could then use the same infrastructure as those relying parties that are capable of using stronger algorithms to verify the signatures. These composite crypto structures would allow the support of older or already-in-the-field devices that have hardware constraints, such as a P-256 element that can only do P-256 encryption, without compromising the overall security of the infrastructure by also including stronger keys and algorithms that will be used by more cryptographically capable devices. Furthermore, these structures would support those devices that are able to upgrade, where the devices use the weaker algorithms to start with and then use the stronger algorithms when their cryptographic capabilities are upgraded.

There are two methods of revocation a Certificate Revocation List (CRL) and the Online Certificate Status Protocol (OCSP). The CRL is a list of revoked certificates (by serial number) that have been issued and then subsequently revoked by a given CA. CRLs are generally published on a periodic interval or can be published only when a certificate is revoked by the CA. The composite crypto structures support both methods.

In some embodiments, the CRLs may be signed with composite signatures as described above. In the case of X.509 certificates, the 'signatureAlgorithm' field in the 'CertificateList' structure is set to 'compositeSignatures' and the 'parameters' field is set to NULL. The 'signature' field of the 'CertificateList' is set to the DER representation of the 'CompositeSignaturesValue' that contains all of the signatures generated with the 'compositeKeys' in the signer's certificate.

OCSP requests include an option 'Signature' field, which allows for authentication of the request. In this case, the composite crypto structure may be used to authenticate the OCSP request by using 'CompositeSignatures.' In particular, the 'signatureAlgorithm' algorithm identifier in the 'Signature' structure of the "OCSPRequest' is set to 'compositeSignatures' and the parameters field is set to NULL. The corresponding 'signature' field of the 'Signature' structure is set to the DER representation of the "CompositeSignaturesValue' that contains all of the signatures generated with the 'compositeKeys' in the signer's certificate. The signatures would be calculated as described above.

OCSP response may also be authenticated with a digital signature. The 'BasicOCSPResponse' structure includes 'signatureAlgorithm' and 'signature' field that are compatible with composite signatures. For OCSP responses, the 'signatureAlgorithm' algorithm identifier in the 'BasicOCSPResponse' structure is set to 'compositeSignatures' and the 'parameters' field is set to NULL. The corresponding 'signature' field is set to the DER representation of the 'CompositeSignaturesValue' that contains all of the signatures generated with the 'compositeKeys' in the signer's certificate.

In another embodiment, the composite crypto structures may be used with certificate requests (CSRs). CSRs are usually in the form of a PKCS #10 message. The 'CertificateRequest' structure includes 'signatureAlgorithm' and 'signature' fields that can be used to authenticate the CSRs. In particular, the 'signatureAlgorithm' algorithm identifier in the 'CertificateRequest' structure is set to 'compositeSignatures' and the 'parameters' field is set to NULL. The corresponding 'signature' field is set to the DER representation of the 'CompositeSignaturesValue' that contains all of the signatures generated with the 'compositeKeys' associated with the identity that is requesting a certificate.

In a further embodiment, the composite signatures may be used with the Cryptographic Message Syntax (CMS). The CMS format includes the 'signatureAlgorithm' and 'signature' fields of the 'SignerInfo' structure. In particular, the 'signatureAlgorithm' algorithm identifier in the 'SignerInfo' structure is set to 'compositeSignatures' and the parameters field is set to NULL. The corresponding 'signature' field is set to the DER representation of the 'CompositeSignaturesValue' that contains all of the signatures generated with the 'compositeKeys associated with the signer (e.g., the 'CompositeSubjectKeyInfo' in the signer's certificate).

Many block chain technologies use PKIs to authenticate transactions. The binary field used to carry signature values for these blockchain technologies allow for the use of composite signatures to protect the signed data by using multiple keys associate with a single identity.

In some embodiments, CRLs and OCSP responses may be used revoke individual algorithms used within the composite crypto structures. In these embodiments, the CRL will list the revoked algorithms and the relying parties would then use the other signatures in the composite signature that were generated using non-revoked algorithms. For example, this extension may be implemented as a SEQUENCE OF (1..MAX) OBJECT IDENTIFIER. Each OID in the sequence identifies a specific algorithm which, if on the list, MUST not be used for any operation. This ensures that the certificates do not need to be reissued while they still have non-revoked signature algorithms. This system may also be used with the OCSP requests and response.

This will allow the revocation of a single key in a compositePublicKey. If any of the basic keys within the compositePublicKey are revoked (e.g., compromised), the CRL would carry the revocation entry for that certificate and a non-critical extension in the entry that provides the hashing algorithm plus the list of the hashes of the keys (i.e., SEQUENCE OF OCTET STRING) that were compromised. This allows relying parties that do not know how to process the extension to reject the certificate (since the relying party would not know which of the keys could still be trusted). Additionally, relying parties that understand the extension could remove the identified keys from the validation process and, if the relying party cannot verify at least one of the remaining signatures, the entire signature is rejected.

In addition, there are mechanisms to identify basic keys that compose the compositePublicKey in a certificate. The definition of an extended subjectKeyIdentifier where the identifiers for the basic SubjectPublicKeyInfo structures that compose the CompositePublicKey (each of which relate to one of the basic keys) are listed. This allows for the easy identification of the compromised basic keys across certificates. This definition may be expressed as:

ExtendedSubjectKeyIdentifier::=SEQUENCE OF (1..MAX) KeyIdentifier

The KeyIdentifier is an OCTET STRING where the value of each KeyIdentifier is the KeyIdentifier for a basic key in the compositePublicKey.

FIG. 1 is a schematic illustration of a composite signature process 100 and the data structures used with the composite signature process, according to an embodiment. In process 100, a signing party 102 generates a digital certificate 104 that is conveyed to a relying party 106. In some embodiments, the signing party 102 and the relying party 106 are in communication. In other embodiments, the relying party 106 is not in communication with the signing party 102. In some embodiments, the signing party 102 is a trusted Certificate Authority (CA) or other certificate issuer.

In the exemplary embodiment, signing party 102 and relying party 106 are computing devices including at least one processor in communication with at least one memory device.

In the exemplary embodiment, the signing party 102 signs the digital certificate 104 using three Keys (Key K1 108, Key K2 110, and Key K3 112). In some embodiments, the three Keys 108, 110, and 112 use the same cryptographic scheme with different hashing algorithms (e.g., one signature could be RSAwithSHA256 and another signature could be RSAwithSHA512). In other embodiments, the three Keys 108, 110, and 112 use different cryptographic schemes with the same hashing algorithm (e.g., one signature could be with RSAwithSHA256 and another could be ECDSAwithSHA256). In still other embodiments, the three Keys 108, 110, 112 may be use a combination of the two strategies (e.g., K1 may use RSAwithSHA256, K2 may use RSAwithSHA512, and K3 may use ECDSAwithSHA256.

In the exemplary embodiment, the signing party 102 uses the three keys 108, 110, and 112 to generates a CompositeSignature 114 to include three Signatures (Signature S1 116, Signature S2 118, and Signature S3 120). The signing party 102 generates the three Signatures S1 116, S2 118, and S3 120 using the three respective keys K1 108, K2 110, and K3 112. The signing party 116 places the first signature S1 116 first in the CompositeSignature 114. The signing party 116 places the second signature S2 118 second in the CompositeSignature 114. And the signing party 116 places the third signature S3 120 third in the CompositeSignature 114. The signing party 102 also places information about the three keys K1 108, K2 110, and K3 112 in the digital certificate 104. In some embodiments, the signing party 102 includes the PublicKeys K1 122, K2 124, and K3 126 in the digital certificate 104. The PublicKeys K1 112, K2 124, and K3 126 are associated with keys K1 108, K2 110, and K3 112, respectively.

The relying party 106 receives the digital certificate 104, such as from a website. The relying party 106 retrieves the PublicKeys K1 112, K2 124, and K3 126 from the digital certificate 104. The relying party 106 validates each of the Signatures S1 116, S2 118, and S3 120 with the provided PublicKeys K1 112, K2 124, and K3 126, respectively. In some embodiments, the relying party 106 checks a CRL or performs an OCSP request to confirm the validity of the digital certificate 104. As a part of validating the digital certificate 104, the relying party 106 confirms the validity of the three PublicKeys K1 112, K2 124, and K3 126 and their corresponding algorithms prior to validating the Signatures S1 116, S2 118, and S3 120.

In some embodiments, the relying party 106 is only capable of performing the cryptographic validation of one or more of the Signatures S1 116, S2 118, and S3 120, rather than all of them. This may be the case where the relying party 106 has a limited cryptographic suite.

Figure 2:
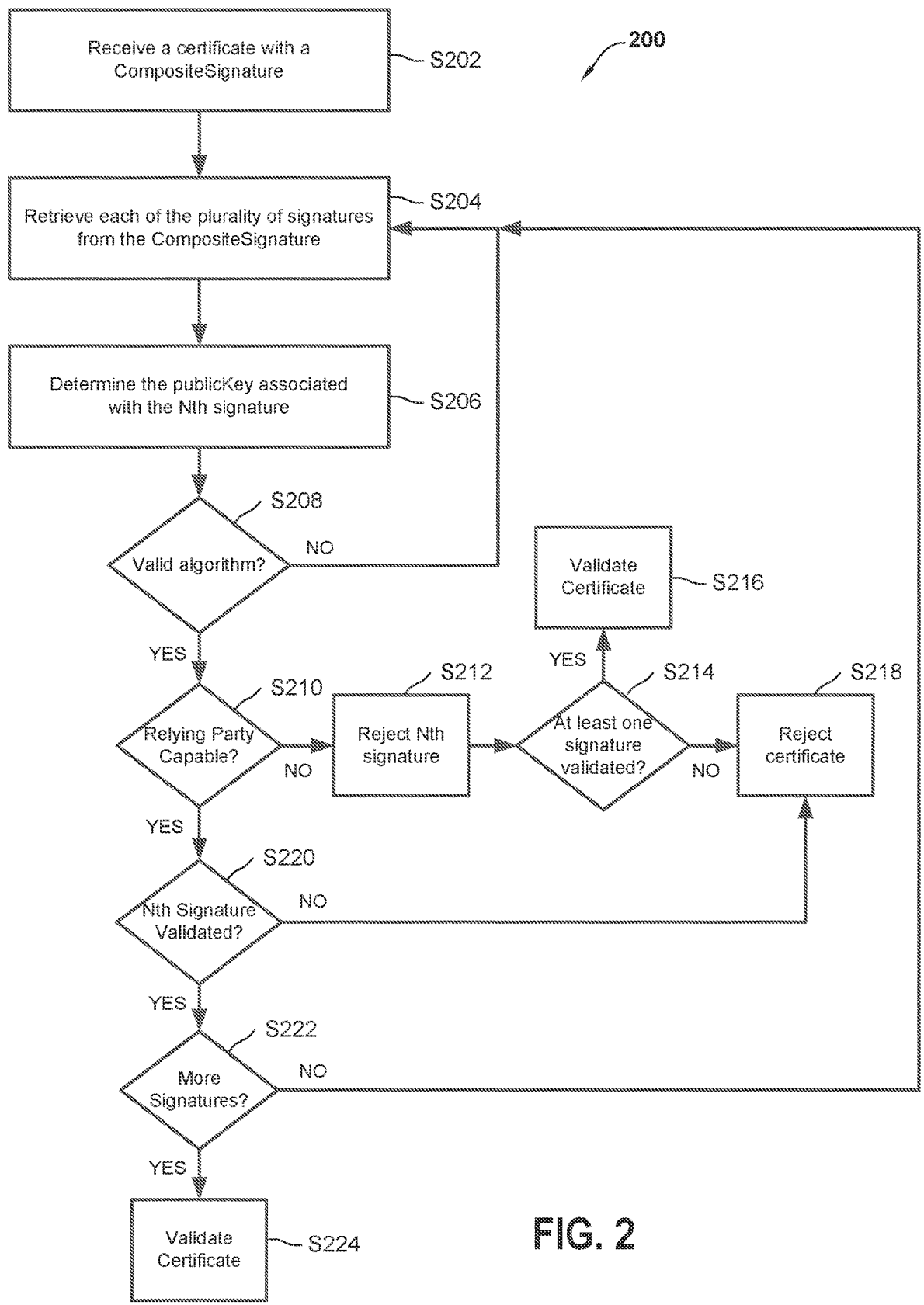
FIG. 2 is a schematic illustration of a composite signature validation process in accordance with the composite signature process and the data structures shown in FIG. 1.

FIG. 2 is a schematic illustration of a composite signature validation process 200 in accordance with the composite signature process 100 and the data structures (shown in FIG. 1). In the exemplary embodiment, process 200 is performed by the relying party 106 (shown in FIG. 1).

In the exemplary embodiment, the relying party 106 receives S202 a digital certificate 104 with a CompositeSignature 114 (both shown in FIG. 1). The relying party 106 retrieves S204 each of the Signatures S1 116, S2 118, and S3 120 (all shown in FIG. 1) from the CompositeSignature 114. For each one of the Signatures S1 116, S2 118, and S3 120, the relying party 106 determines S206 the PublicKey associated with the signature. For example, PublicKey K2 124 is associated with Signature S2 118. In the exemplary embodiment, relying party 106 starts with the first Signature S1 116 and continues through the signatures in their order in the CompositeSignature 114.

The relying party 106 determines S208 whether or not the algorithm associated with the current key and signature is still valid. This may be by determining whether the algorithm has been revoked, such as by comparing the algorithm to a CRL or OCSP response. If the algorithm is not valid, the relying party 106 moves on to the next key in the CompositeSignature 114.

If the algorithm is valid, the relying party 106 determines S210 if it is capable of validating the signature using that algorithm. This check is to determine if the relying party 106 has the cryptographic capability to handle the algorithm. If the relying party 106 is not capable, then the relying party 106 rejects S212 the current signature. If the relying party 106 validated S214 at least one of the signatures in the CompositeSignature 114, then the relying party 106 validates S216 the digital certificate 104. If the relying party 106 has not validates S214 at least one signature, then the relying party 106 rejects S218 the digital certificate 104. For example, a relying party 106 may only be able to process RSA encryption and Signatures S1 116 and S2 118 are encrypted using RSA, while S3 120 is encrypted with EC. Then if the relying party 106 validated at least one of the RSA signatures, the relying party 106 may S216 validate the digital certificate 104. In some embodiments, Steps S214, 216, and 218 are performed after all of the Signatures S1 116, S2 118, and S3 120 have been put through the validation process. In these embodiments, after Step S212, the relying party 106 proceeds to validate the next signature.

In the exemplary embodiment, the relying party 106 determines S220 if the signature is valid using the associated PublicKey. If the signature is not valid, then the relying party 106 may reject S218 the digital certificate 104. If the signature is valid, the relying party 106 determines S222 if there are more signatures to validate. If there are, then the relying party 106 proceeds to the next signature in the CompositeSignature. If there are no more signatures to process, the relying party 106 may validate S224 the digital certificate 104. In some embodiments, the relying party 106 may validate S224 the digital certificate 104 if it validated all of the signatures that it was capable of, aka those whose algorithms it supported and had not been revoked.

While the above description lists one or more specific cryptographic algorithms, one having skill in the art would understand that other cryptographic algorithms may be used. For example, in the algorithmIdentifier field 218, SHA-256 may be identified as being used. However, the system explicitly allows support for any number of other algorithms to be used herein. The above systems describe multiple different potential security considerations to improve the security of the digital certificates and provide for extended life and expanded use possibilities for these certificates. Other security considerations would be known to ones having skill in the art.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The exemplary embodiments provided herein describe a system for enhanced public key encryption infrastructure that allows for expanded encryption options, that is advantageously disposed within one or more of the computer device and the certificate authority. The system thus functions as a verification system capable of: (i) allowing certificates to still be used after one of their cryptographic algorithms have been revoked; (ii) supporting multiple encryption methods, simultaneously; (iii) supporting different devices that have different cryptographic capabilities; (iv) providing support for quantum resistant cryptographic techniques; (v) allowing for backwards compatibility with existing systems; and (vi) limiting the required changes to existing digital certificate data structures to provide enhanced encryption options.

The aspects described herein may be implemented as part of one or more computer components such as a client device and/or one or more back-end components, such as a relying party and signing party, for example. Furthermore, the aspects described herein may be implemented as part of computer network architecture and/or a cognitive computing architecture that facilitates communications between various other devices and/or components. Thus, the aspects described herein address and solve issues of a technical nature that are necessarily rooted in computer technology.

For instance, aspects include analyzing the multiple signatures of digital certificates to ensure the security of those digital certificates and allow them to be used by multiple devices with different cryptographic capabilities. Furthermore, these aspects reduce the chance of data compromise and extend the lifespan of digital certificates. Without the improvements suggested herein, additional processing and memory usage would be required to perform such activities. Additional technical advantages include, but are not limited to: i) allowing certificates to still be used after one of their cryptographic algorithms have been revoked; ii) supporting multiple encryption methods, simultaneously; iii) supporting different devices that have different cryptographic capabilities; iv) providing support for quantum resistant cryptographic techniques; v) allowing for backwards compatibility with existing systems; and vi) limiting the required changes to existing digital certificate data structures to provide enhanced encryption options. Additional technical advantages are described in other sections of the specification.

The methods and systems described herein may be implemented using computer programming or engineering techniques including computer software, firmware, hardware, or any combination or subset thereof, wherein the technical effects may be achieved by performing at least one of the following steps: (a) receive a digital certificate including a composite signature field including a plurality of signatures, wherein the plurality of signatures include at least a first signature and a second signature; (b) retrieve, from the digital certificate, a first key associated with the first signature from the digital certificate; (c) retrieve the first signature from the composite signature field; (d) validate the first signature using the first key; (e) retrieve, from the digital certificate, a second key associated with the second signature; (f) retrieve the second signature from the composite signature field; (g) validate the second signature using the second key; (h) retrieve, from the digital certificate, a third key associated with the third signature of the plurality of signatures; (i) retrieve the third signature from the composite signature field; (j) validate the third signature using the third key; (k) determine a first cryptographic algorithm associated with the first key; (l) determine if the first cryptographic algorithm is valid; (m) determine if the first cryptographic algorithm is valid based on at least one of an Online Certificate Status Protocol (OCSP) and a Certificate Revocation List (CRL); (n) determine if the computer device is capable of processing the first algorithm; and (o) determine a second cryptographic algorithm associated with the second signature, wherein the first cryptographic algorithm and the second cryptographic algorithm are different.

The technical effects may also be achieved by performing at least one of the following steps: (a) generate a first signature using a first key and a first cryptographic algorithm; (b) generate a second signature using a second key and a second cryptographic algorithm; (c) combine the first signature and the second signature into a composite signature; (d) generate a digital certificate including the composite signature in a single field, wherein the composite signature includes a first signature, a second signature, and a third signature; (e) store the first key in a first field of the plurality of fields and a first identifier for the first cryptographic algorithm in a second field of the plurality of fields; and (f) store the second key in a third field of the plurality of fields and a second identifier for the second cryptographic algorithm in a fourth field of the plurality of fields, wherein the single field is a fifth field of the plurality of fields, and wherein the first cryptographic algorithm and the second cryptographic algorithm are different.

Furthermore, the embodiments described herein improve upon existing technologies, and improve the functionality of computers, by more accurately predict or identify the current status of digital certificates. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of secure Internet communications. The present embodiments enable more reliable updating and monitoring of such communications, but without compromising data and speed. Furthermore, according to the disclosed techniques, user computer device are better able to monitor and determine the security of websites and other connected devices, and thereby protecting computer devices from malicious actors.

Exemplary embodiments of systems and methods for determining revocation statuses of digital certificates are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for an enhanced public key infrastructure (PKI), comprising:
    a processor; and
    a memory device in operable communication with the processor, and configured to store a plurality of computer-executable instructions therein, which, when executed by the processor, cause the processor to:
    receive a digital certificate including a composite signature field including a plurality of signatures including at least a first signature and a second signature, wherein the digital certificate is generated with a quantum resistant algorithm;
    retrieve, from the digital certificate, a first key associated with the first signature from the digital certificate;
    retrieve the first signature from the composite signature field; validate the first signature using the first key;
    retrieve, from the digital certificate, a second key associated with the second signature;
    retrieve the second signature from the composite signature field;
    validate the second signature using the second key;
    validate the received digital certificate based on the validation of the first and second signatures retrieve, from the digital certificate, a third key associated with the third signature of the plurality of signatures; retrieve the third signature from the composite signature field; and validate the third signature using the third key.

2. The system in accordance with claim 1, wherein the instructions further cause the processor to determine a first cryptographic algorithm associated with the first key.

3. The system in accordance with claim 2, wherein the instructions further cause the processor to determine if the first cryptographic algorithm is valid.

4. The system in accordance with claim 3, wherein the instructions further cause the processor to determine that the first cryptographic algorithm is valid based on at least one of an Online Certificate Status Protocol (OCSP) and a Certificate Revocation List (CRL).

5. The system in accordance with claim 2, wherein the instructions further cause the processor to determine that the computer device is capable of processing the first algorithm.

6. The system in accordance with claim 2, wherein the instructions further cause the processor to determine a second cryptographic algorithm associated with the second signature, wherein the first cryptographic algorithm is different from the second cryptographic algorithm.

7. A computing device for an enhanced public key infrastructure (PKI), comprising:
    a processor; and
    a memory device in operable communication with the processor, and configured to store a plurality of computer-executable instructions therein, which, when executed by the processor, cause the processor to:
    generate a first signature using a first key and a first cryptographic algorithm;
    generate a second signature using a second key and a second cryptographic algorithm;
    combine the first signature and the second signature into a composite signature;
    generate, with a quantum resistant algorithm, a digital certificate including the composite signature in a single field; and
    generate a third signature using a third key and a third cryptographic algorithm,
    wherein the first signature and the second signature are associated with a same first certificate authority (CA).

8. The computing device in accordance with claim 7, wherein the digital certificate includes a plurality of fields, and wherein instructions further cause the processor to:
    store the first key in a first field of the plurality of fields and a first identifier for the first cryptographic algorithm in a second field of the plurality of fields; and
    store the second key in a third field of the plurality of fields and a second identifier for the second cryptographic algorithm in a fourth field of the plurality of fields.

9. The computing device in accordance with claim 8, wherein the Single field is a fifth field of the plurality of fields.

10. The computing device in accordance with claim 7, wherein the first cryptographic algorithm and the second cryptographic algorithm are different.

11. The computing device in accordance with claim 7, wherein the composite signature includes a first signature, a second signature, and a third signature.

12. The system in accordance with claim 1, wherein the instructions further cause the processor to receive, from the digital certificate, a composite key including a plurality of keys including at least the first and second keys.

13. The system in accordance with claim 12, wherein the plurality of keys includes a non-ordered set of keys.

14. The system in accordance with claim 12, wherein the plurality of keys includes an ordered sequence of keys.

15. The computing device in accordance with claim 7, wherein the instructions further cause the processor to generate a composite key including at least the first and second keys.

16. The computing device in accordance with claim 15, wherein the composite key includes a non-ordered set of keys.

17. The computing device in accordance with claim 15, wherein the composite key includes an ordered sequence of keys.

* * * * *